Figure 1:
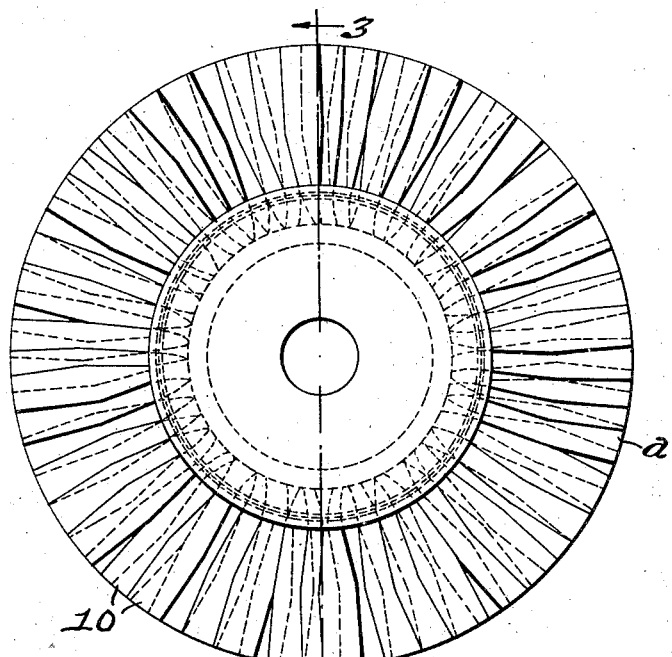

Feb. 7, 1939.   G. R. CHURCHILL   2,146,284
ROTARY BUFFING DEVICE
Filed March 19, 1937   4 Sheets-Sheet 1

INVENTOR
George R. Churchill
BY Jas. H. Churchill
ATTORNEY

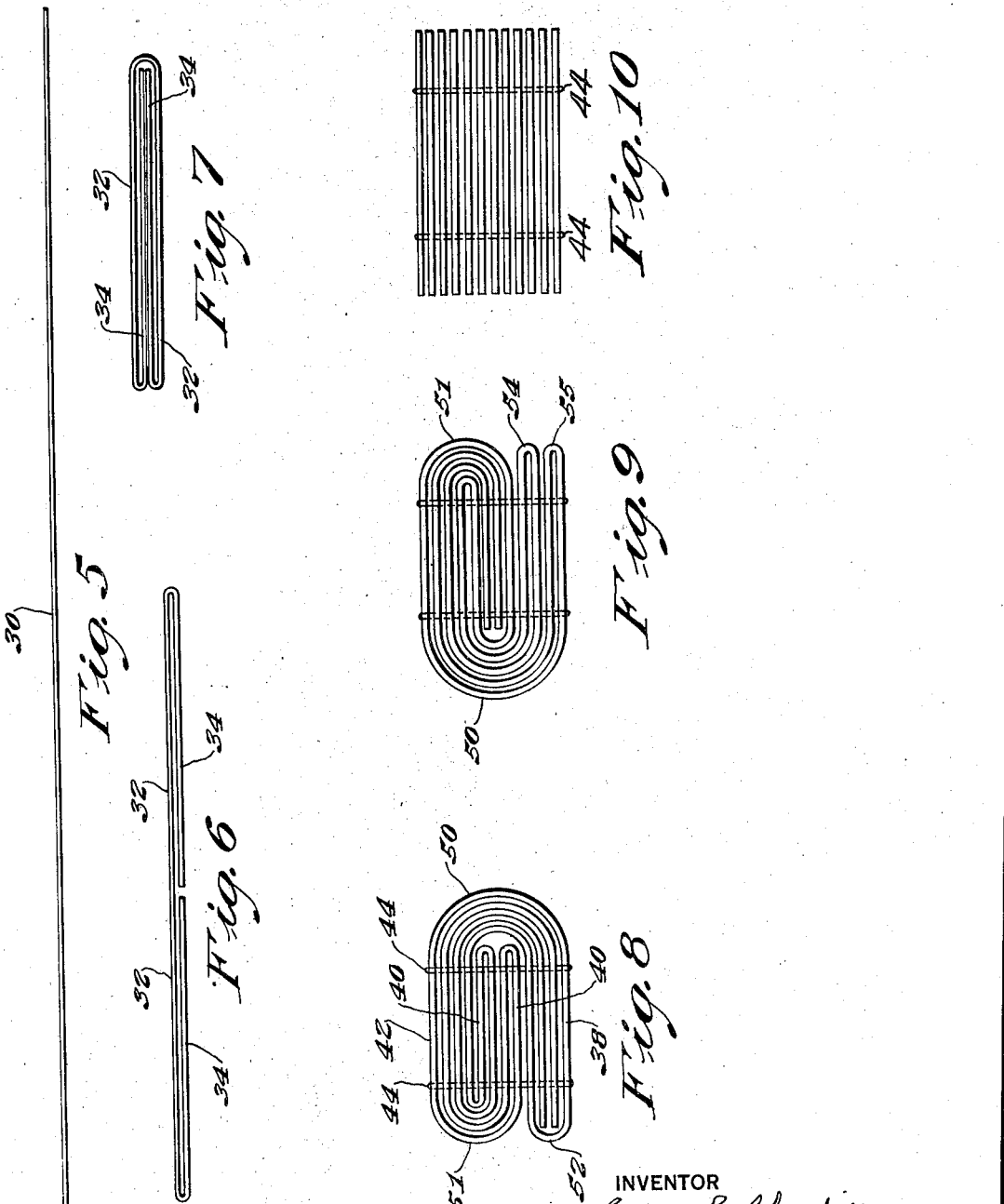

Feb. 7, 1939.   G. R. CHURCHILL   2,146,284
ROTARY BUFFING DEVICE
Filed March 19, 1937   4 Sheets-Sheet 3
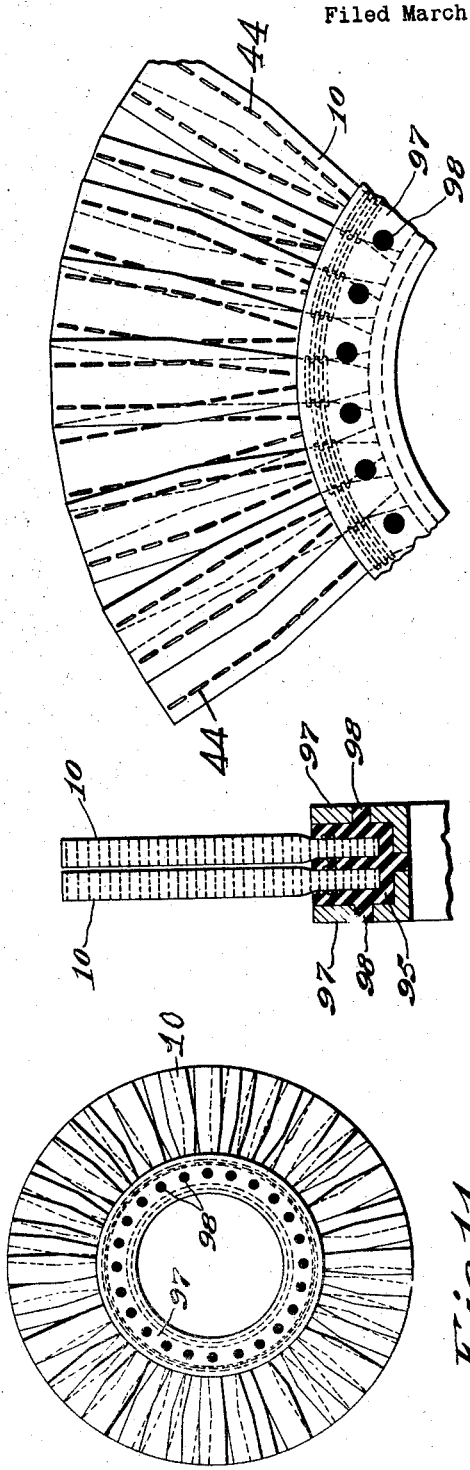
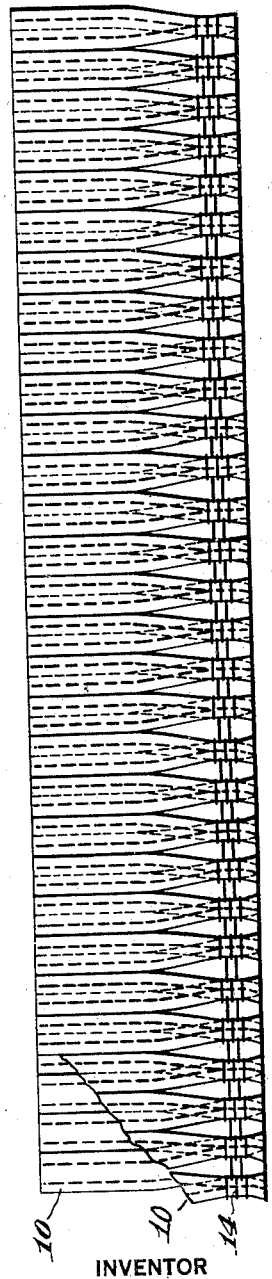
INVENTOR
George R. Churchill
BY Jas. H. Churchill
ATTORNEY Feb. 7, 1939.　　G. R. CHURCHILL　　2,146,284
ROTARY BUFFING DEVICE
Filed March 19, 1937　　4 Sheets-Sheet 4

INVENTOR
George R. Churchill
BY Jas. H. Churchill.
ATTORNEY

Patented Feb. 7, 1939

2,146,284

UNITED STATES PATENT OFFICE 2,146,284

ROTARY BUFFING DEVICE

George R. Churchill, Atlantic Quincy, Mass.

Application March 19, 1937, Serial No. 131,868

5 Claims. (Cl. 51—190)

This invention relates to a rotary device for use in the industrial arts for cleaning, polishing, coloring, finishing and burnishing metals and other materials, and particularly to that character of work commonly called buffing, and such rotary device will be hereinafter referred to as a buffing device.

The invention has for an object to provide a rotary buffing device which is highly efficient in operation, durable, relatively inexpensive and capable of rapidly buffing objects having regular and/or irregular surfaces.

To this end, the rotary buffing device is provided with a plurality of buffing fingers circumferentially arranged about a supporting member, and each composed of a plurality of layers of cloth or like fabric, which layers are preferably formed by folding upon itself a piece of cloth so as to form a substantially flat finger of material length, width and thickness having a continuous edge on one side and one or more continuous edges on the other or opposite side, as will be described.

The final folds of the finger may be stitched or otherwise secured together to maintain the folds of the finger in practically fixed relation to one another and thereby provide the finger with sufficient stiffness to enable it to strike the work a blow with the free end of the finger, and which is sufficiently flexible to yield under such blow and form an air gap between its outer or free end and that of the next succeeding finger of the rotary buffing device.

In the preferred construction of buffing finger two side folds are made which overlap each other, and each side fold cooperates with the portion between the overlapping side folds to provide the finger with continuous front and rear side edges which serve to cut the work and also to resist the wear of the finger under conditions of use and thus contribute to the durability and to the efficiency of the finger as a buffing member. The outer ends of the fingers serve as receptacles or pockets for the buffing material or compound now commonly used in buffing operations, and constitute the effective polishing or other working surfaces of the fingers.

The inner ends of the fingers are firmly held in close contact with one another, preferably by wires which are woven to form a shed for each of the buffing fingers, and said weaving wires are secured together at their free ends to form a closed ring of buffing fingers. In the preferred construction one or more rings of buffing fingers are concentrically arranged about relatively firm disks of cardboard or other material, and each ring of buffing fingers is interposed between pieces or layers of rubber, which are solid or substantially solid so as to be handled, which pieces or layers of rubber are preferably in disk form, and when thus assembled, the rubber disks are subjected to heat and pressure, for a length of time sufficient to render the solid rubber disk or pieces plastic, so that the rubber disks or layers under continued heat and pressure will form a unitary rubber structure, in which portions of the rubber disk are forced between the cloth buffing fingers and their centering disks of cardboard or other material and are welded or united together to form the bottom wall of a supporting member for the buffing fingers.

The portion of the rubber disks forced between the buffing fingers and their centering disks cooperate with the outer portions of said rubber disk to form circumferential grooves or channels in the supporting member for the buffing fingers. The rubber of the bottom wall, when in a plastic condition is forced into the pockets at the inner end of the buffing fingers, and the side walls when in a plastic state are forced into the mesh of the side layers of cloth fingers, and the outer circumference of the rubber side walls, which project beyond the weaving wires, are forced into the spaces between adjacent buffing fingers above the weaving wires and overlap the latter and form locking projections, which assist in holding the buffing fingers in their grooves or channels, so as to resist dislodgment of the buffing fingers by centrifugal force at relatively high speeds under conditions of use.

The portions of the solid rubber disks, which extend inwardly from the bottom wall of the supporting member for the buffing fingers, are forced under pressure into intimate contact with the centering disks and cooperate therewith to provide the supporting member with a center member having a spindle bore provided with a circumferential wall, which is composed in part of vulcanized rubber and is of such strength as will resist enlargement of the spindle bore and thereby enable the buffing device to be taken off and put onto the spindle without enlarging the spindle bore with consequent impairment of the work performed by the buffing device.

The centering disks for the rings of buffing fingers may and preferably will be made of cardboard or other material capable of yielding slightly so as to serve as cushioning means for the center portion of the vulcanized rubber disks, and to reduce to a minimum liability of fracturing the relatively thin vulcanized rubber disks, when the buffing device is clamped to the spindle or shaft by the metal plates or disks now commonly used for securing rotary buffing devices to the spindle.

These and other features of this invention will be hereinafter pointed out in the claims at the end of this specification.

Figure 3:
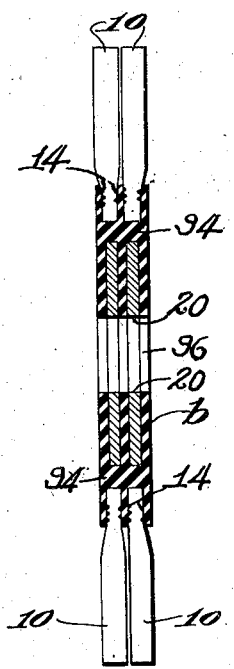
Figure 2:
Figure 4:
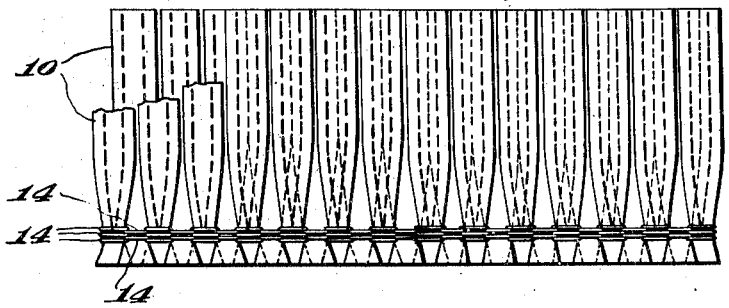
Figure 15:
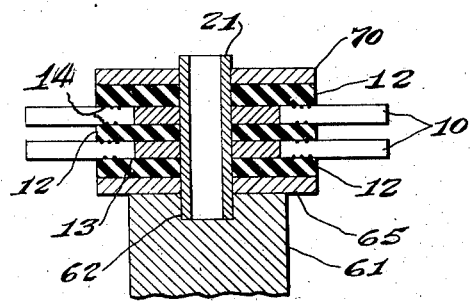
Figure 16:
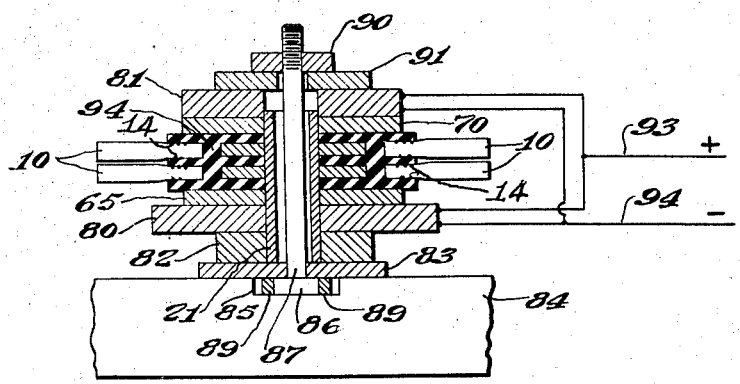
Figure 17:
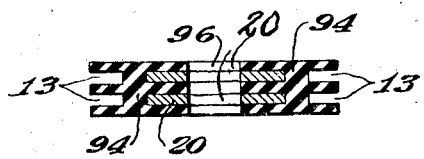

In the accompanying drawings, Fig. 1 is a side elevation of a rotary buffing device embodying this invention; Fig. 2 is a plan view of the buffing device shown in Fig. 1; Fig. 3 is a section of the buffing device taken on the line 3—3 of Fig. 1; Fig. 4 is a detail in elevation of a portion of a ring of buffing fingers to illustrate the manner in which the buffing fingers are compacted at their inner ends and held by the weaving wires; Figs. 5 to 9, inclusive, are diagrammatic views to illustrate the manner in which the buffing fingers shown in Figs. 1 to 4 may be formed, Figs. 8 and 9 being materially enlarged for sake of clearness; Fig. 10 is a plan view of a modified construction of buffing finger; Figs. 11, 12 and 13 are modifications of the supporting member for the buffing fingers; Fig. 14 is an elevation of a portion of the strip of buffing fingers from which the rings of buffing fingers are formed; Fig. 15 is a sectional view to illustrate the assembling of the component parts from which the buffing device shown in Figs. 1 to 3 is made; Fig. 16 is a sectional view to illustrate one form of apparatus with which the rubber disks assembled as shown in Fig. 14 may be vulcanized and formed into the unitary rubber supporting member shown in Figs. 1 and 3; and Fig. 17 is a sectional view on an enlarged scale of the unitary rubber structure with the buffing fingers omitted.

Referring to the drawings, $a$ represents a preferred form of rotary buffing device embodying this invention. In the present instance, the buffing device $a$ is provided with two rows of buffing fingers 10 which are extended radially from the periphery of a unitary vulcanized rubber supporting member or structure $b$. The unitary structure $b$ is made from a plurality of separate pieces or layers of initially solid unvulcanized rubber, which are capable of being handled. In the present instance, three pieces 12 of rubber in the form of disks are employed, see Fig. 15, to form the unitary rubber structure, shown in Figs. 3, 16 and 17, having two circumferentially arranged grooves or channels 13, in which are located and secured the inner ends of the buffing fingers 10. The buffing fingers 10 are connected together at or near their inner ends preferably by wires 14, which are woven so as to form sheds, into each of which an individual buffing finger 10 is inserted and compressed into compact form and firmly held at their inner ends by said wires, so that the buffing fingers may be formed into a continuous strip of any desired length which may be subsequently cut up into suitable lengths according to the diameter or size of the buffing device in which they are to be used. A portion of such continuous strip is represented in Fig. 14. When a desired length of the fingers 10 is cut from the continuous strip, the ends of the wires are secured together to form a closed ring of buffing fingers, which ring has placed in it a disk 20, preferably of relatively firm or hard cardboard so as to center the ring of buffing fingers on a metal tube or mandrel 21 on which the parts of the buffing device are assembled, as will be described.

The disks of rubber 12 and the centering disks 20 are provided with central holes or bores, which are of substantially the diameter or size of the spindle (not shown) upon which the buffing device is mounted when in operation, which diameter of spindle is the same as that of the mandrel 21 on which the separate disks are assembled.

The buffing fingers 10 are, for the best buffing results, made of a plurality of layers of cloth or like fabric, and said buffing fingers are substantially stiff yet flexible, substantially flat and of substantial thickness, and which are durable in operation.

To this end, it is preferred to form the fingers from a piece of cloth fabric by folding the latter longitudinally after the manner represented in Figs. 5 to 9 inclusive.

In Fig. 5 is represented a single layer 30 of a good grade of cotton cloth preferably known as 84/92 or 64/68, which may be of any desired length.

The single layer 30 of cloth is first folded by bringing its side edges to or near the transverse center of the layer 30, so as to form two layers 32, 34 as shown in Fig. 6. One half of these two layers is then folded over upon the other half as represented in Fig. 7, to form four superimposed layers with the two layers 34 between the layers 32. The four layers comprising the folded portion shown in Fig. 7, are then folded so as to provide two side folds 38, 40 which overlap each other and are superimposed on the intermediate portion 42, see Figs. 8 and 9. When thus folded, the side folds 38, 40 are secured to the intermediate portion 42 by one or more rows 44 of stitches or may be otherwise secured so as to compact the superimposed layers and form a strip or length of folded cloth which is cut up into fingers of the desired length. The finger is relatively firm or stiff and yet has some flexibility, and is provided with one or more pockets, which extend lengthwise of the finger and in the present instance are located between the rows 44 of stitches and on opposite sides of said rows of stitches, as clearly shown in Figs. 8 and 9.

The finger 10 thus made is composed of 12 layers of cloth and is of substantial width and thickness so as to afford a substantial area of surface at its end to which the buffing material or compound usually employed may adhere. The compound or buffing material is applied from time to time to the ends of the fingers as the rotary buffing device is revolved and the fingers are worn away in use. By reference to Fig. 8, it will be observed that one side of each finger 10 is provided with a rounded edge 50, which extends lengthwise of the finger, and the other side of the finger is provided with a plurality of rounded edges, marked 51, 52 which are of different thickness from the side edge 50. In the present instance, as shown in Fig. 8, the single continuous edge 50 is composed of six layers of cloth, whereas the opposite edge 51 is composed of four layers and the edge 52 is composed of a single layer. This arrangement of the side edges of the fingers may be obtained by folding the cloth shown in Fig. 7 so that connected ends of the layers 32, 34 are first folded, and the fold comprising the disconnected ends of the layers 34 and the connected layers 32 is caused to overlap the connected ends of the layers 32, 34. In the arrangement shown in Fig. 8, the buffing finger is provided on one side with a single continuous edge 50 and on the other side with two continuous edges 51, 52.

It will be observed that the single continuous edge 50 has four layers connecting eight flat layers, which constitute two outside groups of four flat layers, whereas the continuous edge 51 on the other side connects four outside flat layers with four intermediate flat layers, and that the second continuous edge 52 connects two layers of the other group of outside layers. In this manner the buffing finger is provided on one side with a substantially wide continuous edge and on the other side with two continuous edges of less width than the single continuous edge and which differ in width from each other.

In Fig. 8 the connected end of the folded portion shown in Fig. 7 is folded first, but it is not desired to limit the invention in this respect, as the disconnected ends of the folded portion shown in Fig. 7 may be folded first, as represented in Fig. 9.

In the arrangement shown in Fig. 9, it will be observed that the buffing finger is provided with one relatively wide continuous edge 50 on one side, and with three continuous edges 51, 54, 55 on the other side. The edges 54, 55 are materially narrower than the narrow edge 52, shown in Fig. 8 as each includes but two flat layers of cloth. The fingers 10 may be arranged so as to first present the single wider and thicker side edge 50 to the work, or they may be arranged so as to first present the plurality of narrower continuous edges 51, 52 to the work, or they may be without definite arrangement. The wider continuous edge 50 may be designated the front edge and the narrower continuous edges the rear edges.

The wider or front edges 50 of the fingers strike the work a relatively hard blow and effectively cut and buff the regular surfaces of the work or enter substantially wide cavities therein and buff the same. The narrower or rear edges do not strike so severe a blow and are able to enter narrower cavities and contact with and buff the walls of the same. The buffing fingers are preferably provided with the continuous side edges as they have been found to be especially effective in the case where the buffing operation is more or less severe, as when it is desired to cut or remove portions of the surface to eliminate scratches or other blemishes on the work. In other cases, where the surface of the work is free from imperfections and it is desired to impart a lustre to the surface of the work, softer fingers may be used for this purpose, which softer fingers may be made as shown in Fig. 10 wherein a plurality of individual layers of cloth, secured together by rows of stitches 44 have the side edges of the layers free or disconnected. In operation with the buffing device herein shown, the outer or free ends of the fingers strike the work edge on as the buffing device is revolved, and the free end of each finger in a row of fingers is forced backward from a succeeding finger in the row and forms an air gap between the free ends of said fingers through which heat, which may be generated at the free ends of the fingers, may be dissipated.

In Fig. 15 is shown one form of apparatus in which the individual members of the buffing device shown in Figs. 1 to 3, may be assembled preparatory to having the solid or non-plastic rubber members heated and vulcanized and formed into a unitary structure, which constitutes a preferred form of supporting member for the fingers 10 and which may be formed in the apparatus shown in Fig. 16. The apparatus shown in Fig. 15 will be hereinafter designated the assembling apparatus, and the apparatus shown in Fig. 16 will be designated the vulcanizing apparatus. The assembling apparatus as shown in Fig. 15 is provided with the metal tube 21 of the same diameter as the spindle (not shown) upon which the rotary buffing device is to be mounted.

The metal tube 21 is supported by a suitable base 61 and has its lower end located in a socket 62 in the upper surface thereof. A metal plate 65 is placed on the tube 21 and rests on the base 61. A layer or disk 12 of solid or non-plastic rubber is placed on the tube 21 and rests on the metal plate 65. The size or diameter of the rubber disk 12 will vary according to the size of the rotary buff desired as will be described. A cardboard disk 20 of smaller diameter than the rubber disk 12 and a ring of buffing fingers 10 are placed on the tube 21 next to the rubber disk 12. A second layer or disk 12 of rubber is next placed on the tube 21 and a second cardboard disk 20 and a ring of buffing fingers 10 is placed on the tube 21 next to the second disk of rubber. A third disk 12 of rubber is then placed on the tube 21 next to the second cardboard disk 20 and its ring of buffing fingers 10. A top metal plate 70 of the same diameter as the bottom metal plate 65 is then placed on the tube 21 and rests on the top rubber disk 12. The tube 21 and the parts mounted thereon are now transferred as a unit to the vulcanizing apparatus shown in Fig. 16.

The vulcanizing aparatus shown in Fig. 16 consists of a bottom heating plate or member 80 and a top heating plate 81 between which the assembled buffing unit is placed. The bottom heating plate or member 80 rests on a bushing 82 which rests on a metal plate 83 fastened to a base 84, which is provided with a socket 85 in which is located the head 86 of a bolt 87. The bolt 87 is restrained from rotation, which may be effected as herein shown by metal fingers or bars 89 projecting from the underside of the plate 83 and extended into the socket 85. The heating plate 80 and the bushing 82 are provided with a hole of sufficiently large diameter to permit the lower end of the metal tube 21 to pass therethrough. The bolt 87 extends through the assembled unit and the top heating plate 81 resting on the plate 70.

The solid or unvulcanized rubber members of the assembled unit are then subjected to pressure by means of a nut 90 on the bolt 87, which nut rests on a presser bar or washer 91 resting on the top heating plate 81.

The top heating plate 81 is made of sufficient thickness to permit it to be moved over the tube 21 toward the lower heating plate 80. The heating plates 80, 81 may be heated in any suitable manner as by steam or as herein represented by current taken from an electric circuit 93, 94. The operator now turns up the nut 90 to initially compress the rubber members of the unit, and then supplies the heating plates 80, 81 with current. The solid or non-plastic rubber members 12 are subjected to heat until the latter are rendered plastic or in such condition as will permit the rubber to flow under pressure. This condition may be made known to the operator by timing or by noting the heat which radiates from the top heating plate 81, or by testing the temperature of the latter by applying a moistened finger thereto, after the manner a woman tests the heat of a flat iron or in any other suitable manner. When the heating plates 80, 81 have reached the proper or desired temperature to render the separate or disconnected layers 12 of rubber plastic or substantially flowable, the nut 90 is turned up to apply additional pressure to the top heating plate 70 which additional pressure is transmitted to the component parts of the buff between the metal plates 70, 65. Under this pressure, the rubber of the initially non-plastic and disconnected disks or members 12, which is now in a plastic condition, is caused to move or flow in two directions, namely axially and radially with relation to the metal tube 21. In the axial movement of the rubber, the rubber disks or layers 12 are materially reduced in thickness and portions thereof are forced between the cardboard disks and the inner or butt ends of the buffing fingers, which latter are moved outwardly away from the cardboard disks 20 and leave between them spaces which are filled with plastic rubber, which is united or welded with the rubber on opposite sides of the buffing fingers 10, and cooperates with such rubber to form a unitary rubber structure, having transverse or axial wall 94 of rubber between the inner and outer circumferences of the unitary rubber structure.

As the plastic rubber is moved axially, portions thereof are caused to move radially so as to materially reduce the thickness of the side walls of the grooves or channels 13 in which the buffing fingers are located, and such rubber portions are also simultaneously moved axially into the spaces between the buffing fingers 10 beyond the weaving wires 14 to overlap the latter and form, when cooled, locking projections of rubber which assist in retaining the buffing fingers in fixed relation to the unitary rubber structure against displacement by centrifugal force at relative high speeds.

After the additional pressure has been applied to the rubber members of the buffing device, they are further subjected to heat until the rubber members are completely cooked or vulcanized. After the rubber has been properly cooked or vulcanized, the current is cut off from the heating plates and the rubber cooled under pressure which may be effected in the vulcanizing apparatus, but it is preferred to remove the buffing device from the vulcanizing apparatus and place it under pressure and allow the unitary rubber structure to cool and harden. This may be effected by mounting the tube 21, the metal plates 70, 65 and the interposed buffing device on a bolt provided with a nut by which the pressure may be restored to the unitary rubber structure and allow the latter to cool and harden. When the rubber is thus cooled the pressure is released, the end plates 70, 65 and tube 21 removed, the surface trimmed and the device is ready for use.

The portions of the unitary rubber structure within the axially extended annular wall 94 of said structure, cooperate with the cardboard centering disks 20 to provide the unitary rubber structure with a spindle bore 96 having a circumferential wall composed in part of vulcanized rubber, which resists wear and enlargement of the spindle bore under conditions of use, and permits the buffing devices to be taken off and put on the spindle without rendering it out of balance.

The cardboard centering disks 20 cooperate with the hard rubber portions of the spindle bore to cushion the same and prevent fracture when clamped on the spindle with the usual metal end clamping plates or disks (not shown).

The size of the rotary buffing device shown in Figs. 1 to 3 may be varied within limits to suit the particular work to be performed, by varying the diameter or size of the unvulcanized rubber disks 12, the length of the buffing fingers 10 and in some cases the diameters of the centering disks 20. For instance, if a buffing device of 14 inches in diameter having a length of finger in the clear of three inches is desired, solid rubber disks 12 of eight inches in diameter would be used, with buffing fingers of four inches in length. If a rotary buffing device of twelve inches in diameter is desired with fingers of three inch length in the clear, a rubber disk 12 six inches in diameter would be used. If a buffing device of ten inches in diameter with a length of finger in the clear of two inches is desired, rubber disks 12 of six inches in diameter with fingers of three inches in length and with centering disks 20 of a correspondingly smaller size would be used.

By referring to Figs. 3 and 16, it will be observed that the rotary buffing device herein described, is provided with two rows of buffing fingers 10, but it is not desired to limit the invention in this respect, as the buffing device may be provided with any desired number of rows of fingers within limits. It is preferred to provide the buffing device with two rows of buffing fingers and to mount a plurality of the same on a spindle, if a longer or wider buffing device is desired.

In the present instance, the unitary vulcanized rubber structure forms a preferred form of supporting member for the buffing fingers but it is not desired to limit the invention to this particular form of supporting member, as the buffing fingers herein shown and described may be used to good advantage with other forms of supporting members, which may be a metal ring to which the buffing fingers are mechanically secured, or which may be the construction represented in Figs. 11, 12 and 13, wherein the supporting member is shown as a unitary rubber structure 95, which is formed from solid rubber rings by heat and pressure and has secured to it metal rings 97 by vulcanized rubber rivets 98 extended through holes in the metal rings 97 and normally forming part of the solid rubber rings from which the unitary vulcanized rubber structure is made.

By reference to Fig. 2 it will be observed, that the circumferential working surface of the rotary buffing device is formed by the outer ends of the buffing fingers which are irregularly positioned with relation to one another and form a working surface having spaces between ends of buffing fingers, which afford opportunity for the cutting edges of the fingers to strike the work a sharp blow and effectively cut the work and remove projecting portions thereof and render the surface of the work smooth.

So also it will be observed that the outer ends of the fingers have a substantial surface which engages and buffs the portions of the work cut by the edge of said finger.

Having thus described the invention, what is claimed is:

1. A rotary buffing device provided with a hub member, and a plurality of self-supporting separate cloth fingers secured to the hub member and extending radially therefrom, at least some of said fingers being adapted during the use of the buff to flex whereby to air-cool the buff and impart a combined cutting and buffing effect upon the work, said last-mentioned fingers each comprising a plurality of layers of cloth folded to provide circumferentially spaced radially extending edges with at least one said edge having a continuous outer layer of cloth and means extending lengthwise of said fingers intermediate said radial edges of said fingers for securing said layers together.

2. A rotary buffing device provided with a hub member, and a plurality of self-supporting cloth fingers secured to the hub member and extending radially therefrom, at least some of said fingers being adapted during the use of the buff to flex whereby to air-cool the buff and impart a combined coating and buffing effect upon the work, the last-mentioned fingers each comprising a plurality of layers of cloth folded to provide folded portions at circumferentially spaced edges of the finger, and lines of stitching extending lengthwise of the fingers intermediate said edges and forming with said folded portions constituting said edges of the fingers a plurality of stiffening ribs.

3. A rotary buffing device comprising a closed ring of connected and radially extended fingers, at least some of said fingers comprising a plurality of layers of cloth folded to provide circumferentially spaced edges having a plurality of superimposed continuous layers of cloth forming at least one radial edge, and means to secure said layers together intermediate said edges to render said fingers self-supporting.

4. A rotary buffing device provided with a finger supporting member and a plurality of self-supporting cloth fingers secured at their inner ends to said finger supporting member and extending radially therefrom and adapted during the use of the buff to flex, whereby to air-cool the buff and impart a combined cutting and buffing effect upon the work, said fingers comprising a plurality of layers of cloth each having a substantially uniform circumferential dimension, the fingers having their inner ends circumferentially compressed to a substantially less size than the outer ends, whereby an increased number of fingers for a given size of buff may be obtained.

5. A rotary buffing device provided with a finger supporting member and a plurality of self-supporting cloth fingers secured at their inner ends to said finger supporting member and extending radially therefrom and adapted during the use of the buff to flex, whereby to air-cool the buff and impart a combined cutting and buffing effect upon the work, the fingers comprising a plurality of layers of cloth connected together and having binding strands woven about the inner ends thereof to circumferentially compress the said inner ends and to connect adjacent fingers together into a row.

GEORGE R. CHURCHILL.